United States Patent
Ko et al.

(10) Patent No.: US 9,776,099 B2
(45) Date of Patent: Oct. 3, 2017

(54) COMPOSITION FOR PREPARING LIQUID DROPLETS

(71) Applicant: LOTTE FINE CHEMICAL CO., LTD., Ulsan (KR)

(72) Inventors: Kwang Nam Ko, Seoul (KR); Eun Jung Lee, Seoul (KR)

(73) Assignee: LOTTE FINE CHEMICAL CO., LTD., Nam-Gu, Ulsan (KR)

( * ) Notice: Subject to any disclaimer, the term of this patent is extended or adjusted under 35 U.S.C. 154(b) by 0 days.

(21) Appl. No.: 15/100,472

(22) PCT Filed: Nov. 25, 2014

(86) PCT No.: PCT/KR2014/011383
§ 371 (c)(1),
(2) Date: May 31, 2016

(87) PCT Pub. No.: WO2015/102230
PCT Pub. Date: Jul. 9, 2015

(65) Prior Publication Data
US 2016/0375374 A1   Dec. 29, 2016

(30) Foreign Application Priority Data
Dec. 31, 2013   (KR) .................. 10-2013-0169399

(51) Int. Cl.
| | |
|---|---|
| C11D 1/94 | (2006.01) |
| A63H 33/28 | (2006.01) |
| C09D 101/28 | (2006.01) |
| C11D 3/04 | (2006.01) |
| C11D 3/20 | (2006.01) |
| C11D 3/22 | (2006.01) |
| C11D 17/00 | (2006.01) |

(52) U.S. Cl.
CPC .......... *A63H 33/28* (2013.01); *C09D 101/284* (2013.01); *C11D 1/94* (2013.01); *C11D 3/046* (2013.01); *C11D 3/2006* (2013.01); *C11D 3/221* (2013.01); *C11D 3/225* (2013.01); *C11D 17/0039* (2013.01)

(58) Field of Classification Search
None
See application file for complete search history.

(56) References Cited

U.S. PATENT DOCUMENTS

| | | | | |
|---|---|---|---|---|
| 4,318,746 A | * | 3/1982 | Claffey | ............... A61K 9/0014 106/162.8 |
| 6,008,172 A | * | 12/1999 | Broshi | ................... A23G 3/346 424/49 |
| 6,056,983 A | * | 5/2000 | Broshi | ................... A23G 3/346 426/548 |
| 6,593,375 B2 | * | 7/2003 | Ammon, Jr. | ........ B01F 17/0021 446/15 |
| 6,699,823 B2 | * | 3/2004 | Bettiol | .................. C11D 3/001 510/101 |
| 2002/0022669 A1 | | 2/2002 | Tomida | |
| 2008/0176977 A1 | * | 7/2008 | Pastorello | ................ C08K 5/20 524/105 |
| 2012/0046214 A1 | * | 2/2012 | Braeckman | .............. C11D 1/83 510/235 |
| 2015/0056884 A1 | * | 2/2015 | Fogarty | .................. A63H 33/28 446/15 |
| 2016/0158663 A1 | * | 6/2016 | Fogarty | .................. A63H 33/18 446/15 |

FOREIGN PATENT DOCUMENTS

| | | | |
|---|---|---|---|
| JP | 2003-301200 | * | 10/2003 |
| JP | 2003301200 A | | 10/2003 |
| KR | 1020040039615 A | | 5/2004 |

OTHER PUBLICATIONS

International Search Report with English Translation for International Application No. PCT/KR2014/011383 dated Feb. 25, 2015.
Written Opinion for International Application No. PCT/KR2014/011383 dated Feb. 25, 2015.

* cited by examiner

*Primary Examiner* — Melvin C Mayes
*Assistant Examiner* — Colette Nguyen
(74) *Attorney, Agent, or Firm* — Cantor Colburn LLP

(57) ABSTRACT

A liquid droplet-making composition is provided. The liquid droplet-making composition may provide a liquid droplet with improved retentivity by including cellulose ether and a saccharide.

9 Claims, 3 Drawing Sheets

COMPOSITION FOR PREPARING LIQUID DROPLETS

TECHNICAL FIELD

The present disclosures relates to a liquid droplet-making composition, and more particularly, to a liquid droplet-making composition, including cellulose ether and a saccharide.

BACKGROUND ART

Liquid droplets such as soap bubbles are widely used as toys for animals or kids, or for stage decoration. In general, liquid droplets may be created using a mixed solution including water and a surfactant, such as dishwashing liquids or soaps, or using a commercially purchasable liquid droplet-making composition. A commercially purchasable liquid droplet-making composition may include a surfactant for forming liquid droplets, and glycerin for improving retentivity of liquid droplets. However, liquid droplets made with such a conventional liquid droplet-making composition are more likely to burst by contact with a dry surface of an object or by moisture evaporation from the surface of the liquid droplets, and thus may have a limitation such as a very short lasting period.

DETAILED DESCRIPTION OF THE INVENTION

Technical Problem

The present invention provides a liquid droplet-making composition including cellulose ether and a saccharide to be able to form an outer wall layer on the surface of liquid droplets, so that the liquid droplets may be maintained for an extended lasting period without being affected by environmental factors such as humidity and temperature.

Technical Solution

According to an aspect of the present invention, there is provided a liquid droplet-making composition including: about 100 parts by weight of water; about 1 to about 15 parts by weight of a surfactant; about 60 to about 110 parts by weight of a drying agent; about 1.5 to about 3 parts by weight of cellulose ether; about 5 to about 70 parts by weight of a saccharide; and about 0.01 to about 10 parts by weight of a surfactant stabilizer.

The surfactant may include an amphoteric surfactant and an anionic surfactant in a weight ratio of about 1.0:1 to about 3.0:1.

The amphoteric surfactant may include at least one betaine-based amphoteric surfactant selected from the group consisting of cocamidopropyl betaine, octyl betaine, cetyl betaine, stearyl betaine, and any combinations thereof, and the anionic surfactant may include at least one anionic surfactant selected from the group consisting of sulfonate-based anionic surfactants comprising disodium laureth sulfonate, alpha olefin sulfonate, linear alkylbenzene sulfonate, sodium alkane sulfonate, or any combinations thereof; and sulfate-based anionic surfactants comprising sodium lauryl sulfate, sodium laureth sulfate, or any combinations thereof.

The drying agent may include at least one alcohol selected from the group consisting of methanol, ethanol, propanol, isopropanol, and any combinations thereof.

The cellulose ether may include hydroxypropyl methylcellulose, methylcellulose, carboxymethylcellulose, or any combinations thereof.

A 2 wt % aqueous solution of the hydroxypropyl methylcellulose may have a viscosity of about 1,000 cps to about 10,000 cps.

The saccharide may include at least one saccharide selected from monosaccharides comprising dextrose, xylose, fructose, or any combinations thereof; and disaccharides comprising sucrose, maltose, lactose, or any combinations thereof.

The surfactant stabilizer may include sodium chloride, magnesium chloride, calcium chloride, magnesium sulfate, or any combinations thereof.

The liquid droplet-making composition may have a viscosity of about 200 cps to about 5,000 cps.

Advantageous Effects

According to the one or more embodiments of the present disclosure, a liquid droplet-making composition may include cellulose ether and a saccharide to be able to form an outer wall layer on the surface of a liquid droplet, and thus may provide the liquid droplet with improved retentivity.

According to the one or more embodiments of the present disclosure, a liquid droplet-making composition may not include a cationic surfactant that is harmful to the human body so as to form safe liquid droplets as toys for kids.

BEST MODE

Hereinafter, embodiments of a liquid droplet-making composition will now be described in greater detail.

Figure 1:
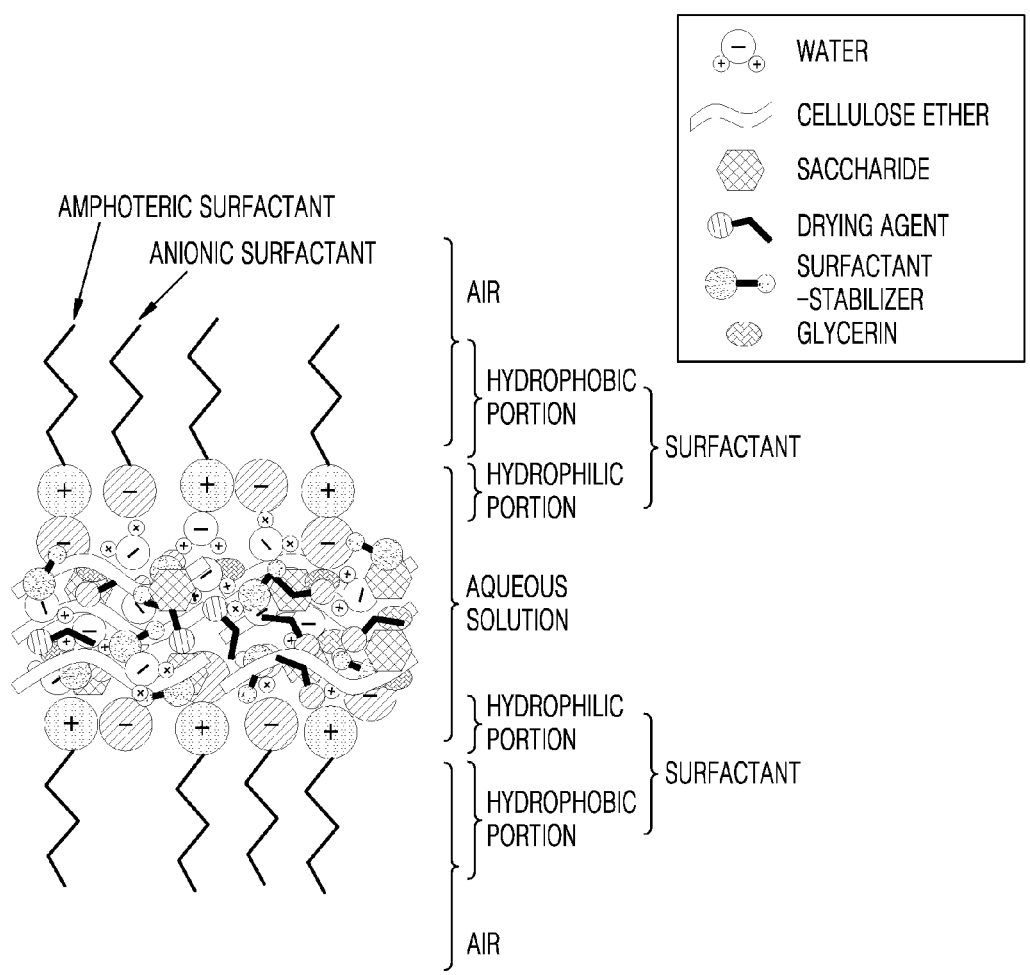
FIG. 1 is a partial cross-sectional view of a liquid droplet formed from a liquid droplet-making composition according to an embodiment.

As used herein, the term ⌈liquid droplet⌋ refers to a liquid droplet, including a soap bubble, formed from a mixed solution of at least water and a surfactant. Referring to FIG. 1, a surfactant may include a hydrophilic portion that is oriented toward an aqueous solution part of a liquid droplet, and a hydrophobic portion that is oriented toward the air. The aqueous solution part of a liquid droplet may include a water-soluble material. For example, the water-soluble material may include cellulose ether, a saccharide, a drying agent, glycerin, and/or a surfactant stabilizer, as described later.

Figure 2:
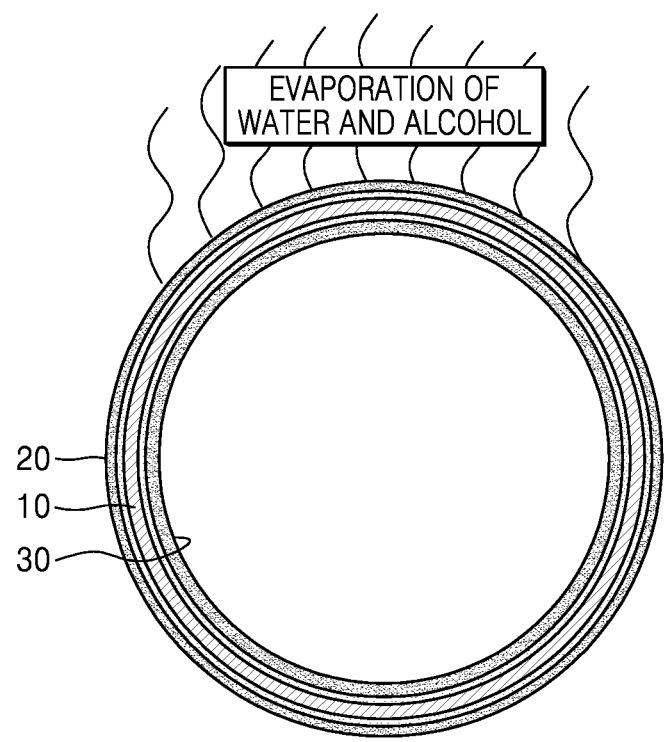
FIG. 2 is a sectional view of a liquid droplet formed from a liquid droplet-making composition according to an embodiment.

As used herein, the term ⌈outer wall layer⌋ refers to a layer of a liquid droplet, including at least cellulose ether and a saccharide therein. The term ⌈moisture layer⌋ refers to a layer of the liquid droplet, including water and a drying agent therein. The moisture layer may include an outer moisture layer 20 outside an outer wall layer 10 of a liquid droplet (i.e., in a direction opposite to the center of the liquid droplet), and an inner moisture layer 30 inside the outer wall layer 10 of the liquid droplet (i.e., in a direction toward the center of the liquid droplet), as shown in FIG. 2.

According to another aspect of the present disclosure, a liquid droplet-making composition includes water, a surfactant, a drying agent, cellulose ether, a saccharide, and a surfactant stabilizer.

The liquid droplet-making composition may include about 1 part by weight to about 15 parts by weight of the surfactant based on 100 parts by weight of the water. When the amount of the surfactant is within this range, the liquid droplet-making composition may form a liquid droplet with improved retentivity, and may prevent agglomeration of the surfactant.

The surfactant may include an amphoteric surfactant and an anionic surfactant. Due to the inclusion of an amphoteric surfactant and an anionic surfactant, the liquid droplet-making composition may stabilize the orientation of water molecules and the surfactants on the surface of the liquid droplet, and may lower surface tension of water.

The liquid droplet-making composition does not include a cationic surfactant, and thus is harmless to the human body.

The surfactant may include the amphoteric surfactant and the anionic surfactant in a weight ratio of about 1.0:1 to about 3.0:1. When the weight ratio of the amphoteric surfactant and the anionic surfactant is within this range, the liquid droplet-making composition may form a liquid droplet with improved retentivity and prevent the agglomeration of the surfactant.

The amphoteric surfactant may include at least one betaine-based amphoteric surfactant selected from the group consisting of cocamidopropyl betaine, octyl betaine, cetyl betaine, stearyl betaine, and any combinations thereof. The anionic surfactant may include at least one anionic surfactant selected from sulfonate-based anionic surfactants comprising disodium laureth sulfonate, alpha olefin sulfonate, linear alkylbenzene sulfonate, sodium alkane sulfonate, or any combinations thereof; and sulfate-based anionic surfactants comprising sodium lauryl sulfate, sodium laureth sulfate, or any combinations thereof.

The liquid droplet-making composition may include about 60 parts by weight to about 110 parts by weight of the drying agent based on 100 parts by weight of the water.

The drying agent may facilitate evaporation of water from the outer moisture layer 20 (FIG. 2) of the liquid droplet formed using the liquid droplet-making composition. The greater the amount of water in the liquid droplet, the larger the surface area (i.e., contact area) of the liquid droplet in contact with a surface of an object, and consequentially the more likely the bursting of the liquid droplet may occur. Therefore, the use of the drying agent may increase the evaporation rate of water in the liquid droplet and thus minimize the contact area. Furthermore, even when water is evaporated from the outer moisture layer 20 of the liquid droplet, due to the outer wall layer 10 formed on the surface of the liquid droplet, as described later in greater detail, the liquid droplet may have an extended lasting period (time).

When the amount of the drying agent is within this range, the liquid droplet-making composition may have an appropriate viscosity for liquid droplet formation, and a liquid droplet formed from the liquid droplet-making composition may have an extended lasting period. As used herein, the term ⌈lasting period of a liquid droplet⌋ refers to a time period for which the liquid droplet may exist without bursting.

The drying agent may include at least one alcohol selected from the group consisting of methanol, ethanol, propanol, isopropanol, and any combinations thereof.

The liquid droplet-making composition may include about 1.5 to about 3 parts by weight of the cellulose ether based on 100 parts by weight of the water.

The cellulose ether may give elasticity to a liquid droplet formed from the composition according to any of the embodiments, and may form an outer wall layer of the liquid droplet together with a saccharide, as described later in greater detail, and accordingly, may improve a lasting time period of the liquid droplet.

When the amount of the cellulose ether is within this range, the liquid droplet-making composition may have an appropriate viscosity for liquid droplet formation, and also may form the outer wall layer of the liquid droplet to maintain a shape of the liquid droplet intact even when evaporation of moisture from the outer moisture layer of the liquid droplet occurs.

The cellulose ether may include hydroxypropyl methylcellulose, methylcellulose, carboxymethylcellulose, or any combinations thereof.

A 2 wt % aqueous solution of the hydroxypropyl methylcellulose may have a viscosity of about 1,000 cps to about 10,000 cps. As used herein, the term ⌈viscosity of hydroxypropyl methylcellulose⌋ refers to a viscosity of a 2 wt % aqueous solution of hydroxypropyl methylcellulose measured using an Anton paar MCR 301 rheometer (Heating rate: 2° C./min, Spindle No.: CC 27 8009, and Shear rate (RPM): 1/s).

When the hydroxypropyl methylcellulose has a viscosity within this range, a liquid droplet may be easily made with the composition and may have improved retentivity, and the agglomeration of the surfactant may also be prevented.

The liquid droplet-making composition may include about 5 parts by weight to about 70 parts by weight of the saccharide based on 100 parts by weight of the water. The saccharide may form the outer wall layer of a liquid droplet together with the above-described cellulose ether and thus may increase a lasting time period of the liquid droplet even when evaporation of moisture from the outer moisture layer of the liquid droplet occurs.

When the amount of the saccharide is within this range, the liquid droplet-making composition may form a liquid droplet with improved retentivity.

The saccharide may include at least one saccharide selected from monosaccharides comprising dextrose, xylose, fructose, or any combinations thereof; and disaccharides comprising sucrose, maltose, lactose, or any combinations thereof.

The liquid droplet-making composition may include about 0.01 parts by weight to about 10 parts by weight of the surfactant stabilizer based on 100 parts by weight of the water.

The surfactant stabilizer is an ionic material, and may reduce the electrostatic repelling force between the amphoteric surfactant and the anionic surfactant, to thereby facilitate homogenization of the surfactant.

When the amount of the surfactant stabilizer is within this range, micells formed by the surfactant may be stabilized.

The surfactant stabilizer may include sodium chloride, magnesium chloride, calcium chloride, magnesium sulfate, or any combinations thereof.

The liquid droplet-making composition may further include glycerin, diglycerin, polyglycerin, sorbitol, or any combinations thereof.

The glycerin, diglycerin, polyglycerin, sorbitol, or any combinations thereof may further give the viscosity and elasticity for formation and retention of the liquid droplet to the liquid droplet-making composition The amount of the glycerin, diglycerin, polyglycerin, sorbitol, or any combinations thereof may be from about 1 part by weight to about 15 parts by weight based on 100 parts by weight of the water.

When the amount of the glycerin, diglycerin, polyglycerin, sorbitol, or any combinations thereof is within this range, the liquid droplet-making composition may form a liquid droplet with improved retentivity and may prevent agglomeration of the surfactant.

The liquid droplet-making composition may have a viscosity of about 200 cps to about 5,000 cps. When the liquid droplet-making composition has a viscosity within this range, formation of a liquid droplet may be facilitated and a lasting time period of the liquid droplet may be improved.

MODE OF THE INVENTION

One or more embodiments of the present disclosure will now be described in detail with reference to the following examples. However, these examples are only for illustrative purposes and are not intended to limit the scope of the one or more embodiments of the present disclosure.

EXAMPLES

Example 1, Examples 3 to 6, and Comparative Examples 1 to 5: Preparation of Liquid Droplet-Making Compositions Hydroxypropyl methylcellulose (Samsung Fine Chemicals Co., Ltd. BN₄OH, viscosity: 4,000 cps), cocamidopropyl betaine (30 wt % aqueous solution, ESSENTIAL SOAPS INC., Coco Betaine), sodium lauryl sulfate (DAEJUNG CHEMICALS & METALS Co., LTD.), and sodium chloride (Hanju Corporation, Bon salt) were put into a 120-mL beaker containing 90° C. purified water, and then sucrose (CJ, BEKSUL WHITE SUGAR) was added thereto to prepare a mixed solution. This mixed solution was left at room temperature to cool down to about 70° C., followed by adding ethanol (DAEJUNG CHEMICALS & METALS Co., LTD., fermented ethanol) and glycerin (ESSENTIAL SOAPS INC., vegetable glycerin) to the mixed solution, thereby to prepare a liquid droplet-making composition. The amounts of the ingredients used to form the liquid droplet-making compositions of Examples 1, Examples 3 to 6, and Comparative Examples 1 to 5 are shown in Table 1. The liquid droplet-making compositions of Comparative Examples 1 and 3 included a precipitate, due to the agglomeration of the surfactant.

Example 2: Preparation of Liquid Droplet-Making Composition

A liquid droplet-making composition was prepared in the same manner as in Example 1, Examples 3 to 6, and Comparative Examples 1 to 5, except that dextrose (DAEJUNG CHEMICALS & METALS Co., LTD., dextrose), instead of sucrose, was used. The amounts of the ingredients used to form the composition of Example 2 are shown in Table 1. The numerical values inside the parentheses are amounts recorded as parts by weight.

TABLE 1

| Example | Purified water (g) | EtOH (g) | CPB (g) | SLS (g) | SR (g) or DX (g) | HPMC (g) | GC (g) | NaCl (g) |
|---|---|---|---|---|---|---|---|---|
| Example 1 | 120 (100) | 80 (66.7) | 8 (6.7) | 3 (2.5) | SR: 50(41.7) | 2 (1.7) | 15 (12.5) | 3 (2.5) |
| Example 2 | 120 (100) | 80 (66.7) | 8 (6.7) | 3 (2.5) | DX: 50(41.7) | 2 (1.7) | 15 (12.5) | 1 (0.8) |
| Example 3 | 120 (100) | 80 (66.7) | 8 (6.7) | 3 (2.5) | SR: 50(41.7) | 3 (2.5) | 15 (12.5) | 3 (2.5) |
| Example 4 | 120 (100) | 80 (66.7) | 8 (6.7) | 3 (2.5) | SR: 80(66.7) | 2 (1.7) | 15 (12.5) | 3 (2.5) |
| Example 5 | 100 (100) | 100 (100) | 8 (8) | 3 (3) | SR: 50(50) | 2 (2.0) | 15 (15) | 3 (3.0) |
| Example 6 | 120 (100) | 80 (66.7) | 8 (6.7) | 3 (2.5) | SR: 6(5) | 2 (1.7) | 15 (12.5) | 3 (2.5) |
| Comparative Example 1 | 200 (100) | 0 (0) | 8 (4.0) | 3 (1.5) | SR: 50(25) | 2 (1.0) | 15 (7.5) | 1 (0.5) |
| Comparative Example 2 | 120 (100) | 80 (66.7) | 8 (6.7) | 3 (2.5) | SR: 0(0) | 0 (0) | 15 (12.5) | 0 (0) |
| Comparative Example 3 | 120 (100) | 80 (66.7) | 8 (6.7) | 3 (2.5) | SR: 50(41.7) | 4 (3.3) | 15 (12.5) | 3 (2.5) |
| Comparative Example 4 | 120 (100) | 80 (66.7) | 8 (6.7) | 3 (2.5) | SR: 1.2(1) | 2 (1.7) | 15 (12.5) | 3 (2.5) |
| Comparative Example 5 | 120 (100) | 80 (66.7) | 8 (6.7) | 3 (2.5) | SR: 90(75) | 2 (1.7) | 15 (12.5) | 3 (2.5) |

EtOH: ethanol
CPB: cocamidopropyl betaine
SLS: sodium lauryl sulfate
SR: sucrose
DX: dextrose
HPMC: hydroxypropyl methylcellulose
GC: glycerin
NaCl: sodium chloride Evaluation Example 1: Physical Property Evaluation of Liquid Droplet-Making Compositions (Viscosity)

The viscosity of each of the liquid droplet-making compositions prepared in Examples 1 to 6 and Comparative Examples 1 to 5 was measured using a Brookfield viscometer (Brookfield, LVDV-II+) at room temperature (about 25° C.) and about 6 rpm.

(Surface Tension)

Figure 3:
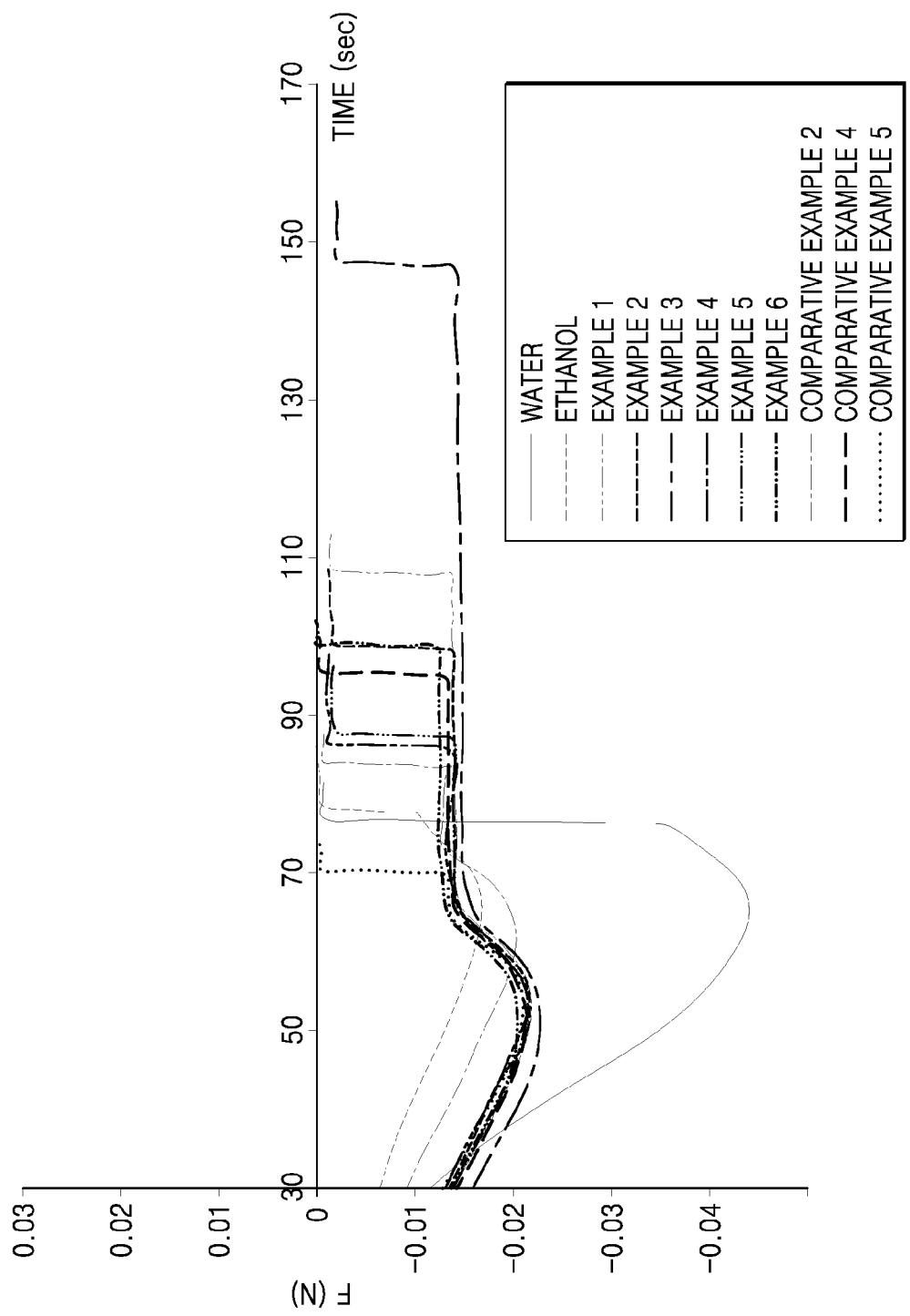
FIG. 3 is a graph of force (F) with respect to time for mixed solutions of each of liquid droplet-making compositions of Examples 1 to 6 and Comparative Examples 2, 4, and 5, water and ethanol, as a result of evaluation using the Du Nouy ring method in which the force (F) required to lift a Du Nouy ring made contact with the surface of a mixed solution of each of the liquid droplet-making compositions, water, and ethanol was measured with respect to time.

Each one of the liquid droplet-making compositions of Examples 1 to 6 and Comparative Examples 2, 4, and 5, water, and ethanol were put, each by 50 mL, into a Petri dish to form a mixed solution, followed by measurement with a texture analyser (Stable Micro Systems Ltd., TAXT plus), in which a Du Nouy ring was made contact with the mixed solution in each of the Petri dishes (depth: about 3 mm) and then vertically lifted at a rate of about 0.1 mm/sec to measure the force required to completely separate the Du Nouy ring from the mixed solution (about 25° C.) with respect to time. The results are shown in FIG. 3. Next, a surface tension (l) of each of the mixed solution was calculated using Equation 1. The results are shown in Table 2. The surface tension measurement was not performed on the mixed solutions including the liquid droplet-making compositions of Comparative Examples 1 and 3, due to the generation of a precipitate in the mixed solutions.

$$l = \Delta F_{max}/2r \quad \text{[Equation 1]}$$

In Equation 1, $\Delta F_{max}$ is the maximum variation of the force (F) required to completely separate the Du Nouy ring in contact with the mixed solution from the mixed solution, and r is the radius of the Du Nouy ring. In this evaluation example, r was about 3.5 cm.

According to Equation 1, the larger the maximum variation of the force ($\Delta F_{max}$) required to completely separate the Du Nouy ring in contact with the mixed solution of a liquid droplet-making composition, water, and ethanol, the larger the surface tension (l).

Referring to FIG. 3, the mixed solutions including the liquid droplet-making compositions of Examples 1 to 6 and Comparative Examples 2, 4, and 5 were found to have a smaller surface tension than water, but a larger surface tension than ethanol.

(Viscoelasticity)

In the same manner as the surface tension measurement, the Du Nouy ring was made contact with a mixed solution of each one of the liquid droplet-making compositions of Examples 1 to 6 and Comparative Examples 2, 4, and 5, water, and ethanol in a Petri dish, and then vertically lifted at a constant rate (i.e., v=0.1 mm/sec) to measure the time (t) from a point of time at which a bottom end of the Du Nouy ring was made contact with a surface of the mixed solution (i.e., the point of time at which the force F was maintained constant) to a point of time at which the mixed solution was completely separated from the bottom end of the Du Nouy ring (i.e., the point of time at which F=0). Then, the distance (D) by which the mixed solution was vertically lifted along the Du Nouy ring was calculated using Equation 2, and was recorded as a viscoelasticity. The viscoelasticity measurement was not performed on the mixed solutions including the liquid droplet-making compositions of Comparative Examples 1 and 3, due to the generation of a precipitate in the mixed solutions.

$$D = v \cdot t \quad \text{[Equation 2]}$$

According to Equation 2, the longer the time (t) from the point of time at which the bottom end of the Du Nouy ring was made contact with the surface of the mixed solution to the point of time at which the mixed solution was completely separated from the bottom end of the Du Nouy ring, the larger the viscoelasticity.

Evaluation Example 2: Physical Property Evaluation of Liquid Droplets Formed from Liquid Droplet-Making Compositions (Bubble-Making Capability)

After dipping a bubble-making stick with a loop at one end (PetQwerks Inc., Doggy Incredibubbles) into the liquid droplet-making compositions of Examples 1 to 6 and Comparative Examples 1 to 5 for about 5 seconds, liquid droplets were formed on a table by blowing once through the loop of the bubble-making stick. The number of liquid droplets made was counted with naked eyes to determine bubble-making capability. The results are shown in Table 2. The ambient temperature and humidity for the test were about 26° C. and about 70%, respectively.

(Bubble's Retentivity)

The number of liquid droplets that did not burst but remained intact upon first contact of the liquid droplets made for the evaluation of the bubble-making capability to the table were counted with naked eyes. A ratio (%) of the number of liquid droplets that remained not burst to a total number of liquid droplets made was recorded as the bubble's retentivity. The results are shown in Table 2.

TABLE 2

| Example | Viscosity (cps) | Surface tension (N/m) | Visco-elasticity (mm) | Bubble-making capability (number) | Bubble's retentivity (%) |
|---|---|---|---|---|---|
| Example 1 | 1,015 | 0.032 | 3.84 | 47 | 76.9 |
| Example 2 | 1,005 | 0.031 | 2.94 | 44 | 73.4 |
| Example 3 | 4,860 | 0.031 | 7.4 | 32 | 85.5 |
| Example 4 | 340 | 0.031 | 1.75 | 24 | 66.1 |
| Example 5 | 900 | 0.031 | 1.88 | 28 | 68.6 |
| Example 6 | 805 | 0.029 | 2.96 | 34 | 60.3 |
| Comparative Example 1 | 7,200 | — | — | 0 | 0 |
| Comparative Example 2 | 4 | 0.029 | 1 | 2 | 0 |
| Comparative Example 3 | 16,900 | — | — | 12 | 76.9 |
| Comparative Example 4 | 740 | 0.029 | 2.63 | 31 | 40.3 |
| Comparative Example 5 | 160 | 0.029 | 0.3 | 0 | 0 |

Referring to Table 2, the liquid droplet-making compositions of Examples 1 to 6 were found to have improved bubble-making capability and bubble's retentivity, compared to those of the liquid droplet-making compositions of Comparative Examples 1 to 5. The liquid droplet-making composition of Comparative Example 3 had a similar bubble's retentivity, but significantly poor bubble-making capability, compared to those of the liquid droplet-making compositions of Examples 1 to 6, making its commercialization difficult.

While one or more embodiments have been described with reference to the to figures, it will be understood by those of ordinary skill in the art that various changes in form and details may be made therein without departing from the spirit and scope as defined by the following claims.

The invention claimed is:

1. A liquid droplet-making composition comprising:
   about 100 parts by weight of water;
   about 1 to about 15 parts by weight of a surfactant;
   about 66.7 to about 100 parts by weight of a drying agent;
   about 1.7 to about 2.5 parts by weight of cellulose ether;
   about 5 to about 66.7 parts by weight of a saccharide;
   about 0.8 to about 3.0 parts by weight of a surfactant stabilizer; and
   about 1 to about 15 parts by weight of glycerin, diglycerin, polyglycerin, sorbitol, or any combinations thereof.

2. The liquid droplet-making composition of claim 1, wherein the surfactant comprises an amphoteric surfactant and an anionic surfactant in a weight ratio of about 1.0:1 to about 3.0:1.

3. The liquid droplet-making composition of claim 2, wherein the amphoteric surfactant comprises at least one betaine-based amphoteric surfactant selected from the group consisting of cocamidopropyl betaine, octyl betaine, cetyl betaine, stearyl betaine, and any combinations thereof, and the anionic surfactant comprises at least one anionic surfactant selected from sulfonate-based anionic surfactants comprising disodium laureth sulfonate, alpha olefin sulfonate, linear alkylbenzene sulfonate, sodium alkane sulfonate, or any combinations thereof; and sulfate-based anionic surfactants comprising sodium lauryl sulfate, sodium laureth sulfate, or any combinations thereof.

4. The liquid droplet-making composition of claim 1, wherein the drying agent comprises at least one alcohol selected from the group consisting of methanol, ethanol, propanol, isopropanol, and any combinations thereof.

5. The liquid droplet-making composition of claim 1, wherein the cellulose ether comprises hydroxypropyl methylcellulose (HPMC), methylcellulose (MC), carboxymethylcellulose (CMC), or any combinations thereof.

6. The liquid droplet-making composition of claim 5, wherein a 2 wt % aqueous solution of the hydroxypropyl methylcellulose (HPMC) has a viscosity of about 1,000 cps to about 10,000 cps.

7. The liquid droplet-making composition of claim 1, wherein the saccharide comprises at least one saccharide selected from monosaccharides comprising dextrose, xylose, fructose, or any combinations thereof; and disaccharides comprising sucrose, maltose, lactose, or any combinations thereof.

8. The liquid droplet-making composition of claim 1, wherein the surfactant stabilizer comprises sodium chloride, magnesium chloride, calcium chloride, magnesium sulfate, or any combinations thereof.

9. The liquid droplet-making composition of claim 1, wherein the liquid droplet-making composition has a viscosity of about 200 cps to about 5,000 cps.

* * * * *